United States Patent
Chen et al.

(10) Patent No.: US 10,169,917 B2
(45) Date of Patent: Jan. 1, 2019

(54) AUGMENTED REALITY

(71) Applicant: Microsoft Technology Licensing, LLC, Redmond, WA (US)

(72) Inventors: Henry Yao-Tsu Chen, Woodinville, WA (US); Brandon V. Taylor, Mercer Island, WA (US); Mark Robert Swift, Mercer Island, WA (US); Austin S. Lee, Pittsburgh, PA (US); Ryan S. Menezes, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/139,095

(22) Filed: Apr. 26, 2016

(65) Prior Publication Data

US 2017/0053447 A1    Feb. 23, 2017

Related U.S. Application Data

(60) Provisional application No. 62/207,753, filed on Aug. 20, 2015.

(51) Int. Cl.
*G06T 19/00* (2011.01)
*G06T 15/20* (2011.01)
(Continued)

(52) U.S. Cl.
CPC ........ *G06T 19/006* (2013.01); *G02B 27/0172* (2013.01); *G06T 15/20* (2013.01);
(Continued)

(58) Field of Classification Search
CPC .......... G06K 9/00664–9/00704; G06F 3/0481; G06F 3/04817; G06F 9/4443;
(Continued)

(56) References Cited

U.S. PATENT DOCUMENTS 6,119,147 A    9/2000   Toomey et al.
6,317,127 B1   11/2001  Daily et al.
(Continued)

FOREIGN PATENT DOCUMENTS

CN   103593867   2/2014
EP   2530588     12/2012
(Continued)

OTHER PUBLICATIONS

"International Search Report and Written Opinion", Application No. PCT/US2016/047665, dated Nov. 21, 2016, 10 pages.
(Continued)

*Primary Examiner* — Todd Buttram
(74) *Attorney, Agent, or Firm* — NovoTechIP International PLLC

(57) ABSTRACT

An augmented reality (AR) system receives a plurality of local 3D models of a part of a real-world environment, each having been generated by a different AR device when located in the real-world environment. The local 3D models are combined to generate a global 3D model, at least part of which is transmitted to a device remote from the real-world environment. The global 3D model represents a greater portion of the real-environment than any of the local 3D models individually. The AR system receives rendering data from the remote device, and transmits it to an AR device when the AR device is located in the real-world environment. Alternatively, the rendering data may be transmitted from the remote device to the AR device via a network directly. The rendering data is for use in rendering a virtual object at the AR device in the real-world environment.

20 Claims, 7 Drawing Sheets

(51) Int. Cl.
  *G02B 27/01* (2006.01)
  *G06T 17/00* (2006.01)
  *G06T 17/20* (2006.01)

(52) U.S. Cl.
  CPC .............. *G06T 17/00* (2013.01); *G06T 17/20* (2013.01); *G02B 2027/0134* (2013.01); *G02B 2027/0138* (2013.01); *G06T 2207/10028* (2013.01); *G06T 2215/16* (2013.01); *G06T 2219/024* (2013.01)

(58) Field of Classification Search
  CPC .. G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
  See application file for complete search history.

(56) References Cited

U.S. PATENT DOCUMENTS

| | | |
|---|---|---|
| 7,010,158 B2 | 3/2006 | Cahill |
| 8,274,550 B2 | 9/2012 | Steuart |
| 8,493,206 B2 | 7/2013 | Richey et al. |
| 8,554,307 B2 | 10/2013 | Razzaque et al. |
| 8,624,924 B2 | 1/2014 | Dobbins et al. |
| 8,737,721 B2 | 5/2014 | Arcas et al. |
| 8,814,691 B2 | 8/2014 | Haddick et al. |
| 8,884,984 B2 | 11/2014 | Flaks et al. |
| 8,922,481 B1 | 12/2014 | Kauffmann et al. |
| 8,982,110 B2 | 3/2015 | Saban et al. |
| 9,049,469 B2 | 6/2015 | Melzer |
| 9,088,787 B1 | 7/2015 | Smith et al. |
| 9,111,134 B1 | 8/2015 | Rogers et al. |
| 9,280,258 B1 | 3/2016 | Bailly et al. |
| 9,294,757 B1 | 3/2016 | Lewis et al. |
| 2002/0075201 A1 | 6/2002 | Sauer et al. |
| 2003/0137506 A1 | 7/2003 | Efran et al. |
| 2004/0104935 A1 | 6/2004 | Williamson et al. |
| 2006/0012596 A1 | 1/2006 | Fukuya |
| 2007/0198534 A1 | 8/2007 | Hon et al. |
| 2008/0034038 A1 | 2/2008 | Ciudad et al. |
| 2009/0221368 A1 | 9/2009 | Yen et al. |
| 2011/0043644 A1 | 2/2011 | Munger et al. |
| 2011/0181591 A1 | 7/2011 | Benitez et al. |
| 2011/0214082 A1 | 9/2011 | Osterhout et al. |
| 2011/0258526 A1 | 10/2011 | Supakkul et al. |
| 2011/0285811 A1 | 11/2011 | Langlotz et al. |
| 2011/0310120 A1 | 12/2011 | Narayanan |
| 2011/0310227 A1 | 12/2011 | Konertz et al. |
| 2012/0019614 A1 | 1/2012 | Murray et al. |
| 2012/0069051 A1 | 3/2012 | Hagbi et al. |
| 2012/0113138 A1 | 5/2012 | Uusitalo et al. |
| 2012/0169838 A1 | 7/2012 | Sekine |
| 2012/0194706 A1 | 8/2012 | Kwak |
| 2012/0224070 A1 | 9/2012 | Buroff |
| 2012/0249741 A1 | 10/2012 | Maciocci et al. |
| 2012/0299962 A1 | 11/2012 | White et al. |
| 2012/0327119 A1 | 12/2012 | Woo et al. |
| 2013/0004060 A1 | 1/2013 | Bell et al. |
| 2013/0031457 A1 | 1/2013 | Griffiths et al. |
| 2013/0091432 A1 | 4/2013 | Shet et al. |
| 2013/0222369 A1 | 8/2013 | Huston et al. |
| 2013/0229535 A1 | 9/2013 | Nakamura |
| 2014/0002490 A1 | 1/2014 | Teegan |
| 2014/0053077 A1 | 2/2014 | Unnikrishnan et al. |
| 2014/0091984 A1 | 4/2014 | Ashbrook et al. |
| 2014/0092135 A1 | 4/2014 | McArdle et al. |
| 2014/0104378 A1 | 4/2014 | Kauff et al. |
| 2014/0125757 A1 | 5/2014 | Lee et al. |
| 2014/0152660 A1 | 6/2014 | Lee et al. |
| 2014/0176661 A1 | 6/2014 | Smurro et al. |
| 2014/0204077 A1* | 7/2014 | Kamuda ............... G06T 19/006 345/419 |
| 2014/0204119 A1 | 7/2014 | Malamud et al. |
| 2014/0210856 A1 | 7/2014 | Finn et al. |
| 2014/0229835 A1 | 8/2014 | Ravine |
| 2014/0240444 A1 | 8/2014 | Szymczyk et al. |
| 2014/0241617 A1 | 8/2014 | Shotton et al. |
| 2014/0327730 A1 | 11/2014 | Wiener et al. |
| 2015/0002636 A1 | 1/2015 | Brown |
| 2015/0054913 A1 | 2/2015 | Annau et al. |
| 2015/0062123 A1 | 3/2015 | Yuen |
| 2015/0145985 A1 | 5/2015 | Gourlay et al. |
| 2015/0156147 A1 | 6/2015 | Liu |
| 2015/0206343 A1 | 7/2015 | Mattila |
| 2015/0301592 A1 | 10/2015 | Miller |
| 2015/0362733 A1 | 12/2015 | Spivack |
| 2016/0253844 A1 | 9/2016 | Petrovskaya et al. |
| 2016/0255126 A1 | 9/2016 | Sarris |
| 2016/0293133 A1 | 10/2016 | Dutt |
| 2017/0053445 A1 | 2/2017 | Chen et al. |
| 2017/0053446 A1 | 2/2017 | Chen et al. |
| 2017/0053455 A1 | 2/2017 | Chen et al. |
| 2017/0053621 A1 | 2/2017 | Chen et al. |
| 2017/0054815 A1 | 2/2017 | Chen et al. |

FOREIGN PATENT DOCUMENTS

| | | |
|---|---|---|
| WO | WO-2012020242 | 2/2012 |
| WO | WO-2014206473 | 12/2014 |

OTHER PUBLICATIONS

"International Search Report and Written Opinion", Application No. PCT/US2016/047663, dated Oct. 31, 2016, 11 pages.
"International Search Report and Written Opinion", Application No. PCT/US2016/047666, dated Nov. 25, 2016, 15 pages.
"Microsoft Hololens Trailer—Sec 1:08-1:13", T6Games Youtube Channel—Retrieved from the Internet: https://www.youtube.com/watch?v=bpXVuRuISHw, Jan. 22, 2015, 4 pages.
"UAB does virtual surgery with VIPAAR and Google Glass", Retrieved at: https://www.youtube.com/watch?v=aTOoBwfqBe0—on Nov. 4, 2016, 2 pages.
Gauglitz, "World-Stabilized Annotations and Virtual Scene Navigation for Remote Collaboration", User Interface Software and Technology ACM, Oct. 5, 2014, 11 pages.
Kasahara, "Second Surface: Multi-user Spatial Collaboration System based on Augmented Reality", 11/28/201, 5 pages.
Lee, "3D Collaboration Method over HoloLens and Skype End Points", Oct. 30, 2015, 4 pages.
Raskar, "The Office of the Future: A Unified Approach to Image-Based Modeling and Spatially Immersive Displays", Proceedings of the 98 SIGGRAPH Conference on Computer Graphics, Jul. 1998, 10 pages.
Riazuelo, "C2TAM: A Cloud framework for Cooperative Tracking and Mapping", Dec. 4, 2013, 14 pages.
Yoon, "Merge the Real World with the Technology World", Daniel Yoon's Blog, Feb. 17, 2015, 3 pages.
"3DF Zephyr", Available at: http://www.3dflow.net/3df-zephyr-pro-3d-models-from-photos/, Apr. 5, 2015, 6 pages.
"6+ More Google Street View Alternatives", Available at: http://www.weboffspring.com/333/6-more-google-street-view-alternatives, Mar. 16, 2010, 4 pages.
"A New Spin for Photosynth", Available at: http://research.microsoft.com/en-us/news/features/photosynth-010714.aspx, Jan. 7, 2014, 3 pages.
"Insight3d—Quick Tutorial", Available at: http://insight3d.sourceforge.net/insight3d_tutorial.pdf, Dec. 29, 2009, 13 pages.
"Microsoft HoloLens", Available at: https://www.microsoft.com/microsoft-hololens/en-us/experience, Aug. 14, 2015, 13 pages.
"What Should I Do If I Want to Make 3D Panorama Photos", Available at: http://www.arcsoft.com/topics/panorama-maker/how-to-create-3d-panorama.html, Dec. 24, 2011, 3 pages.
Baldwin, "Dropbox buys 3D Photo-Stitching App Bubbli with Plans to Integrate Technology", Available at: http://thenextweb.com/apps/2014/05/21/dropbox-buys-3d-photo-stitching-app-bubbli/, May 21, 2014, 7 pages.

(56) References Cited

OTHER PUBLICATIONS

Bargeron,"Annotations for Streaming Video on the Web:System Design and Usage Studies", In TechReport MSR-TR-98-60, Mar. 1999, 8 pages.
Bright,"Hands-on: Microsoft's HoloLens is flat-out magical", Available at: http://arstechnica.com/gadgets/2015/01/hands-on-with-hololens-making-the-virtual-real/, Jan. 22, 2015, 5 pages.
Chen,"Asynchronous 3D Annotation of a Video Sequence", U.S. Appl. No. 62/207,694, filed Aug. 20, 2015., 73 pages.
Chen,"Asynchronous Session on Hololens", U.S. Appl. No. 62/207,727, filed Aug. 20, 2015., 74 pages.
Chen,"Communication System", U.S. Appl. No. 62/207,706, filed Aug. 20, 2015., 40 pages.
Chen,"Roundtrip Reintegration of Asynchronous 3D Session into Hololens Space", U.S. Appl. No. 62/207,732, filed Aug. 20, 2015., 71 pages.
Duval,"What's up with Stereographic 3D Panoramic Video", Available at: http://www.video-stitch.com/whats-stereographic-3d-panoramic-video/, Feb. 2, 2014, 12 pages.
Guerreiro,"Beyond Post-It: Structured Multimedia Annotations for Collaborative VEs", In Proceedings of International Conference on Artificial Reality and Telexistence Eurographics Symposium on Virtual Environments, Dec. 8, 2014, 8 pages.
Heer,"Voyagers and Voyeurs: Supporting Asynchronous Collaborative Visualization", In Proceedings of communications of the ACM, vol. 52, Issue 1, Jan. 2009, pp. 87-97.
Kato,"Marker Tracking and HMD Calibration for a Video-based Augmented Reality Conferencing System", In Proceedings. 2nd IEEE and ACM International Workshop on Augmented Reality, Oct. 20, 1999, 10 pages.
Kiyokawa,"An Occlusion-Capable Optical See-through Head Mount Display for Supporting Co-located Collaboration", In the Second IEEE and ACM International Symposium on Mixed and Augmented Reality, Oct. 7, 2003, 9 pages.
Kleinermann,"Adding Semantic Annotations, Navigation paths and Tour Guides to Existing Virtual Environments", In Proceedings of 13th International Conference of Virtual Systems and Multimedia, Sep. 23, 2007, 12 pages.
Langlotz,"Audio Stickies: Visually-guided Spatial Audio Annotations on a Mobile Augmented Reality Platform", In Proceedings of the 25th Australian Computer-Human Interaction Conference: Augmentation, Application, Innovation, Collaboration, Nov. 25, 2013, pp. 545-554.
Lee,"Augmented Reality", U.S. Appl. No. 62/207,675, filed Aug. 20, 2015, 51 pages.
Minatani,"Face-to-Face Tabletop Remote Collaboration in Mixed Reality", In Proceedings of 6th IEEE and ACM International Symposium on Mixed and Augmented Reality, Nov. 13, 2007, 4 pages.
Pradeep,"Microsoft Has a Holographic TV Studio to Develop Holographic Content for HoloLens", Available at: http://microsoft-news.com/microsoft-has-a-holographic-tv-studio-to-develop-holographic-content-for-hololens/, May 23, 2015, 4 pages.
Preibisch,"Stitching 2D/3D", Available at: http://fiji.sc/Stitching_2D/3D, Oct. 2008, 6 pages.
Rose,"Annotating Real-World Objects Using Augmented Reality", In Technical Report, Jun. 1995, 21 pages.
Tait,"A Projected Augmented Reality System for Remote Collaboration", In Proceedings of IEEE International Symposium on Mixed and Augmented Reality, Oct. 1, 2013, 6 pages.
Uva,"Augmented Reality integration in Product Development", In Proceedings of International conference on Innovative Methods in Product Design, Jun. 15, 2011, pp. 73-79.
Uva,"Distributed Design Review Using Tangible Augmented Technical Drawings", In Journal of Computer-Aided Design, vol. 42, Issue 5, 2010, pp. 364-372.
Verlinden,"Recording Augmented Reality Experiences to Capture Design Reviews", In International Journal for Interactive Design and Manufacturing, vol. 3, Jul. 10, 2009, pp. 189-200.
Wang,"Tangible Mixed Reality for Remote Design Review: A Study Understanding User Perception and Acceptance", In Journal of Visualization in Engineering, August, Aug. 2013, pp. 1-15.
"International Search Report and Written Opinion", Application No. PCT/US2016/047664, dated Dec. 7, 2016, 11 pages.
"International Search Report and Written Opinion", Application No. PCT/US2016/047662, dated Dec. 20, 2016, 11 pages.
"Non-Final Office Action", U.S. Appl. No. 15/141,586, dated Dec. 28, 2017, 16 pages.
"International Preliminary Report on Patentability", Application No. PCT/US2016/047662, dated Nov. 2, 2017, 7 pages.
"International Preliminary Report on Patentability", Application No. PCT/US2016/047666, dated Nov. 3, 2017, 7 pages.
"International Preliminary Report on Patentability", Application No. PCT/US2016/047665, dated Nov. 10, 2017, 7 pages.
"Restriction Requirement", U.S. Appl. No. 15/138,995, dated Nov. 30, 2017, 7 pages.
"Final Office Action", U.S. Appl. No. 15/141,290, dated Feb. 14, 2018, 14 pages.
"International Preliminary Report on Patentability", Application No. PCT/US2016/047664, dated Feb. 20, 2018, 7 pages.
"International Preliminary Report on Patentability", Application No. PCT/US2016/047663, dated Jul. 6, 2017, 6 pages.
"Non-Final Office Action", U.S. Appl. No. 15/141,290, dated Jun. 14, 2017, 12 pages.
"Non-Final Office Action", U.S. Appl. No. 15/141,666, dated Jul. 14, 2017, 20 pages.
"Second Written Opinion", Application No. PCT/US2016/047662, dated Jul. 24, 2017, 6 pages.
"Second Written Opinion", Application No. PCT/US2016/047665, dated Jun. 28, 2017, 6 pages.
"Second Written Opinion", Application No. PCT/US2016/047666, dated Jul. 25, 2017, 6 pages.
"Non-Final Office Action Issued in U.S. Appl. No. 15/138,995", dated Apr. 19, 2018, 17 Pages.
"Final Office Action Issued in U.S. Appl. No. 15/141,666", dated Apr. 19, 2018, 18 Pages.
"Final Office Action Issued in U.S. Appl. No. 15/141,586", dated Sep. 10, 2018, 13 Pages.

* cited by examiner

US 10,169,917 B2

AUGMENTED REALITY

PRIORITY

This application claims priority under 35 U.S.C. § 111(b) to U.S. Provisional patent application No. 62/207,753, titled "Augmented Reality" and filed on Aug. 20, 2015, the entire disclose of which is incorporated by reference herein.

BACKGROUND

Display systems can used to make a desired image visible to a user. Wearable display systems can be embodied in a wearable headset which is arranged to display an image within a short distance from a human eye. Such wearable headsets are sometimes referred to as head mounted displays. Optical components are arranged in a wearable headpiece so as to display the desired image within a few centimeters of the user's eyes.

Some types of display systems provide a view through this optics so that the generated image which is displayed to the user is overlaid onto a real world view. This is referred to as augmented reality ("AR"), or equivalently mixed reality. An example is the Microsoft HoloLens device.

As well as a wearable display system, an augmented reality device may incorporate other components, such as processing unit(s), computer interface(s) that provide network connectivity, and camera(s) etc. These may be housed in the headpiece, as in the HoloLens, or in a separate housing connected to the headpiece by wireless or wired means.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, an augmented reality system comprises a computer interface, a global model generation module, and an augmentation sharing module. The computer interface is configured to receive a plurality of local 3D models of a part of a real-world environment, each having been generated by a different augmented reality device when located in the real-world environment. The global model generation module is configured to combine the local 3D models to generate a global 3D model, and to transmit at least part of the global 3D model to a device remote from the real-world environment. The global 3D model represents a greater portion of the real-environment than any of the local 3D models individually. This allows the remote device to explore and augment a virtual version of the real-world environment remotely. The augmentation sharing module is configured to receive rendering data from the remote device, and to transmit the rendering data to an augmented reality device when the augmented reality device is located in the real-world environment. The rendering data is for use in rendering a virtual object at the augmented reality device in the real-world environment.

In another aspect, the rendering data may be transmitted from the remote device to the augmented reality device via a network directly (i.e. not via the augmented reality system).

BRIEF DESCRIPTION OF FIGURES

For a better understanding of the subject matter and to show how embodiments of the same may be carried into effect, reference is made to the following figures in which.

DETAILED DESCRIPTION

Figure 1A:
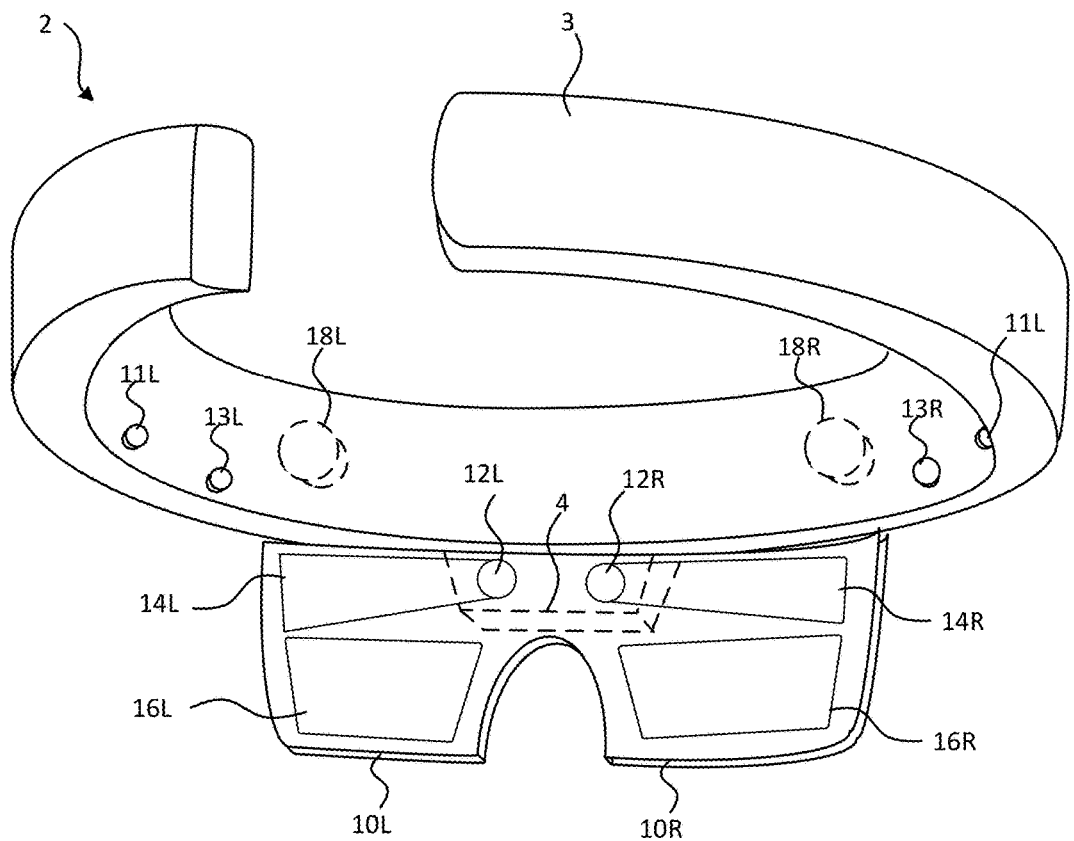
FIG. 1A shows a perspective view of an augmented reality device.
Figure 1B:
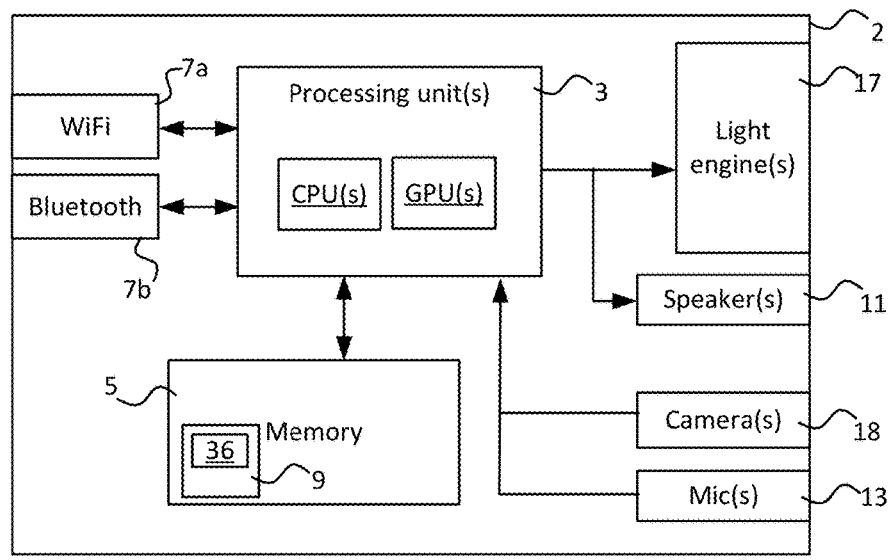
FIG. 1B shows a block diagram of the device.

FIG. 1A shows a perspective view of a wearable augmented reality ("AR") device 2, from the perspective of a wearer 22 of the device 2 ("AR user"). FIG. 1B shows a schematic block diagram of the AR device 2. The AR device 2 is a computer device in the form of a wearable headset. The AR user 22 is not shown in FIG. 1A or 1B, but is depicted in some of the later figures.

The augmented reality device 2 comprises a headpiece 6, which is a headband, arranged to be worn on the wearer's head. The headpiece 6 has a central portion 4 intended to fit over the nose bridge of a wearer, and has an inner curvature intended to wrap around the wearer's head above their ears.

The headpiece 3 supports left and right optical components, labelled 10L and 10R, which are waveguides. For ease of reference herein an optical component 10 will be considered to be either a left or right component, because the components are essentially identical apart from being mirror images of each other. Therefore, all description pertaining to the left-hand component also pertains to the right-hand component. The central portion 4 houses at least one light engine 17 which is not shown in FIG. 1A but which is depicted in FIG. 1B.

The light engine 17 comprises a micro display and imaging optics in the form of a collimating lens (not shown). The micro display can be any type of image source, such as liquid crystal on silicon (LCOS) displays, transmissive liquid crystal displays (LCD), matrix arrays of LED's (whether organic or inorganic) and any other suitable display. The display is driven by circuitry which is not visible in FIGS. 1A and 1B which activates individual pixels of the display to generate an image. Substantially collimated light, from each pixel, falls on an exit pupil of the light engine 4. At the exit pupil, the collimated light beams are coupled into each optical component, 10L, 10R into a respective in-coupling zone 12L, 12R provided on each component. These in-coupling zones are clearly shown in FIG. 1A. In-coupled light is then guided, through a mechanism that involves diffraction and TIR, laterally of the optical component in a respective intermediate (fold) zone 14L, 14R, and also downward into a respective exit zone 16L, 16R where it exits the component 10 towards the users' eye. The optical component 10 is located between the light engine 13 and the eye i.e. the display system configuration is of so-called transmissive type.

The collimating lens collimates the image into a plurality of beams, which form a virtual version of the displayed image, the virtual version being a virtual image at infinity in the optics sense. The light exits as a plurality of beams, corresponding to the input beams and forming substantially the same virtual image, which the lens of the eye projects onto the retina to form a real image visible to the AR user 22. In this manner, the optical component 10 projects the displayed image onto the wearer's eye. The optical components 10L, 10R and light engine 17 constitute display apparatus of the AR device 2.

The zones 12, 14, 16 can, for example, be suitably arranged diffractions gratings or holograms. The optical component 10 has a refractive index n which is such that total internal reflection takes place to guide the beam from the light engine along the intermediate expansion zone 314, and down towards the exit zone 316.

The optical component 10 is substantially transparent, whereby the wearer can see through it to view a real-world environment in which they are located simultaneously with the projected image, thereby providing an augmented reality experience.

To provide a stereoscopic image, i.e. that is perceived as having 3D structure by the user, slightly different versions of a 2D image can be projected onto each eye—for example from different light engines 17 (i.e. two micro displays) in the central portion 4, or from the same light engine (i.e. one micro display) using suitable optics to split the light output from the single display.

The wearable AR device 2 shown in FIG. 1A is just one exemplary configuration. For instance, where two light-engines are used, these may instead be at separate locations to the right and left of the device (near the wearer's ears). Moreover, whilst in this example, the input beams that form the virtual image are generated by collimating light from the display, an alternative light engine based on so-called scanning can replicate this effect with a single beam, the orientation of which is fast modulated whilst simultaneously modulating its intensity and/or colour. A virtual image can be simulated in this manner that is equivalent to a virtual image that would be created by collimating light of a (real) image on a display with collimating optics. Alternatively, a similar AR experience can be provided by embedding substantially transparent pixels in a glass or polymer plate in front of the wearer's eyes, having a similar configuration to the optical components 10A, 10L though without the need for the zone structures 12, 14, 16.

Other headpieces 6 are also within the scope of the subject matter. For instance, the display optics can equally be attached to the users head using a frame (in the manner of conventional spectacles), helmet or other fit system. The purpose of the fit system is to support the display and provide stability to the display and other head borne systems such as tracking systems and cameras. The fit system can be designed to meet user population in anthropometric range and head morphology and provide comfortable support of the display system.

The AR device 2 also comprises one or more cameras 19—stereo cameras 10L, 10R mounted on the headpiece 3 and configured to capture an approximate view ("field of view") from the user's left and right eyes respectfully in this example. The cameras are located towards either side of the user's head on the headpiece 3, and thus capture images of the scene forward of the device form slightly different perspectives. In combination, the stereo camera's capture a stereoscopic moving image of the real-wold environment as the device moves through it. A stereoscopic moving image means two moving images showing slightly different perspectives of the same scene, each formed of a temporal sequence of frames to be played out in quick succession to replicate movement. When combined, the two images give the impression of moving 3D structure.

As shown in FIG. 1B, the AR device 2 also comprises: one or more loudspeakers 11; one or more microphones 13; memory 5; processing apparatus in the form of one or more processing units 3 (e.g. CPU(s), GPU(s), and/or bespoke processing units optimized for a particular function, such as AR related functions); and one or more computer interfaces for communication with other computer devices, such as a Wifi interface 7a, Bluetooth interface 7b etc. The wearable device 3 may comprise other components that are not shown, such as dedicated depth sensors, additional interfaces etc.

As shown in FIG. 1A, a left microphone 11L and a right microphone 13R are located at the front of the headpiece (from the perspective of the wearer), and left and right channel speakers, earpiece or other audio output transducers are to the left and right of the headband 3. These are in the form of a pair of bone conduction audio transducers 111, 11R functioning as left and right audio channel output speakers.

Though not evident in FIG. 1A, the processing apparatus 3, memory 5 and interfaces 7a, 7b are housed in the headband 3. Alternatively, these may be housed in a separate housing connected to the components of the headband 3 by wired and/or wireless means. For example, the separate housing may be designed to be worn or a belt or to fit in the wearer's pocket, or one or more of these components may be housed in a separate computer device (smartphone, tablet, laptop or desktop computer etc.) which communicates wirelessly with the display and camera apparatus in the AR headset 2, whereby the headset and separate device constitute augmented reality apparatus.

The memory holds executable code 9 that the processor apparatus 3 is configured to execute. In some cases, different parts of the code 9 may be executed by different processing units of the processing apparatus 3. The code 9 comprises code of an operating system, as well as code of one or more applications configured to run on the operating system.

Figure 2:
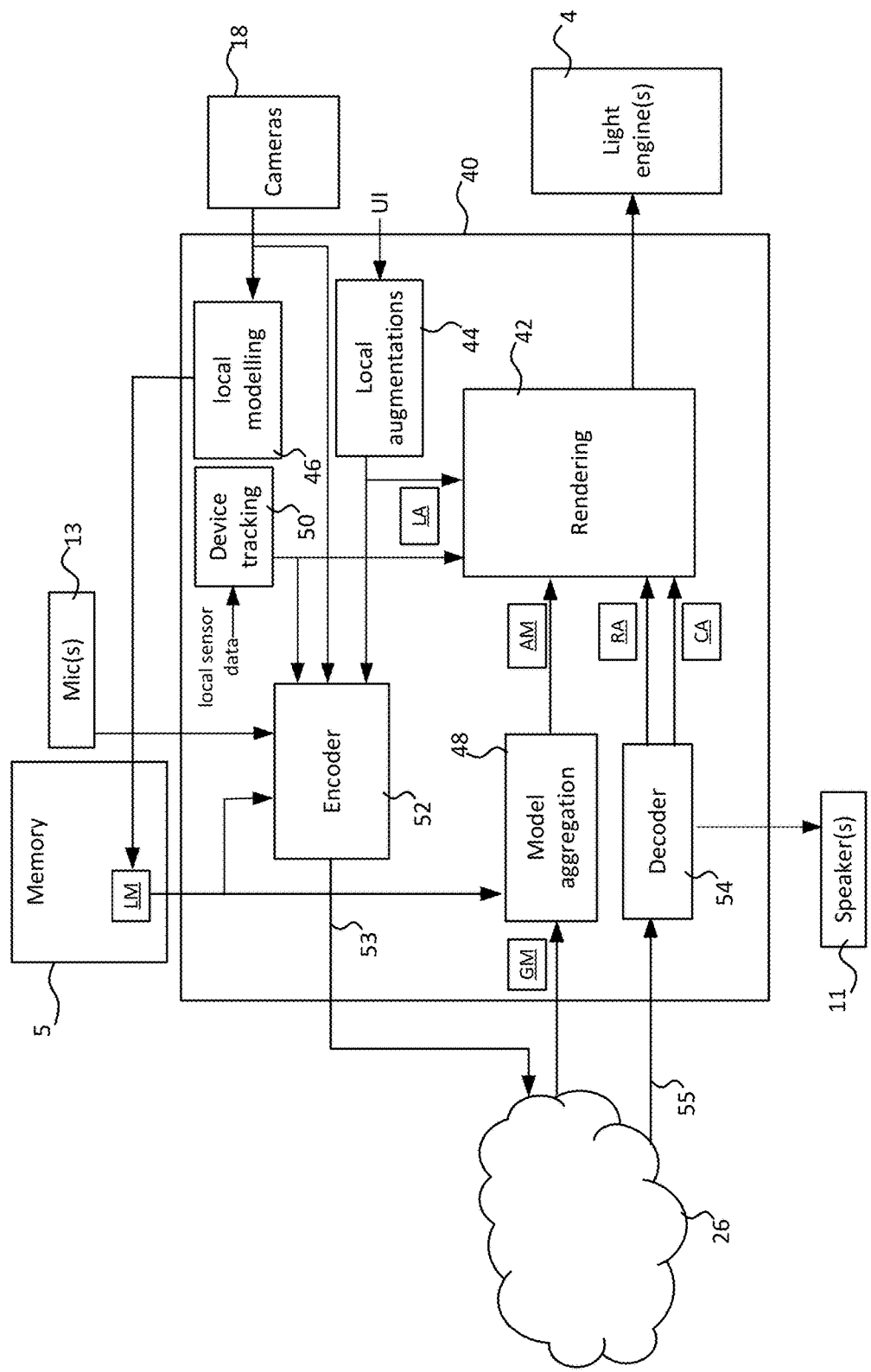
FIG. 2 shows functional modules of an augmented reality device.

FIG. 2 shows a function block diagram of the AR device 2. An AR system 40 is shown, which comprises the following functional modules: a rendering module 42, a local augmentation module 44, a local modelling module 46, a model aggregation module 48, a device tracking module 50, an encoder 52, and a decoder 54. Each of these functional modules may be implemented in software, i.e. they may be code modules of the code 9, dedicated hardware of the AR device 2, or a combination of both software and dedicated hardware.

The rendering module 42 controls the light engine(s) 17 to generate a stereoscopic image visible to the wearer, i.e. to generate slightly different 2D images that are projected onto different eyes by the optical components 10L, 10R substantially simultaneously so as to create the impression of 3D structure.

The stereoscopic image is formed by rendering module 42 rendering at least one virtual display element ("augmentation"), which is perceived as a 3D element, i.e. having perceived 3D structure, at a real-world location in 3D space by the AR user.

An augmentation is defined by rendering data in the form of an augmentation data object stored in the memory 5. The data object comprises: location data defining a desired location in 3D space for the virtual element (e.g. as (x,y,z) Cartesian coordinates); structural data defining 3D surface structure of the virtual element, i.e. a 3D model of the virtual element; and image data defining 2D surface texture of the virtual element to be applied to the surfaces defined by the 3D model. The data object may comprise additional information, such as a desired orientation of the augmentation.

The perceived 3D effects are achieved though suitable rendering of the augmentation data object. To give the impression of the augmentation having 3D structure, a stereoscopic image is generated based on the 2D surface and 3D augmentation model data in the data object, with the augmentation being rendered to appear at the desired location in the stereoscopic image.

A 3D model of part of the part of the real-world in the vicinity of the AR device 2 is used to give the impression of the real-world having expected tangible effects on the augmentation, in the way that it would a real-world object. The 3D model represents surface structure present in the real world, and the information it provides about this surface structure allows an augmentation to be displayed as though it were a rea-world 3D object, thereby providing an immersive augmented reality experience. The 3D model is in the form of 3D mesh.

For example, based on the model of the real-world, an impression can be given of the augmentation being obscured by a real-world object that is in front of its perceived location from the perspective of the user; dynamically interacting with a real-world object, e.g. by moving around the object; statically interacting with a rea-world object, say by sitting on top of it etc.

Whether or not real-world surface structure should affect an augmentation can be determined based on suitable rendering criteria. For example, by creating a 3D model of the perceived AR world, which includes the real-world surface structure and any augmentations, and projecting it onto a plane along the AR user's line of sight as determined using pose tracking (see below), a suitable criteria for determining whether a real-world object should be perceived as partially obscuring an augmentation is whether the projection of the real-world object in the plane overlaps with the projection of the augmentation, which could be further refined to account for transparent or opaque real world structures. Generally the criteria can depend on the location and/or orientation of the augmented reality device 2 and/or the real-world structure in question.

An augmentation can also be mapped to the mesh, in the sense that its desired location and/or orientation is defined relative to a certain structure(s) in the mesh. Should that structure move and/or rotate causing a corresponding change in the mesh, when rendered properly this will case corresponding change in the location and/or orientation of the augmentation. For example, the desired location of an augmentation may be on, and defined relative to, a table top structure; should the table be moved, the augmentation moves with it. Object recognition can be used to this end, for example to recognize a known shape of table and thereby detect when the table has moved using its recognizable structure. Such object recognition techniques are known in the art.

An augmentation that is mapped to the mash in this manner, or is otherwise associated with a particular piece of surface structure embodied in a 3D model, is referred to an "annotation" to that piece of surface structure. In order to annotate a piece of real-world surface structure, it is necessary to have that surface structure represented by the 3D model in question—without this, the real-world structure cannot be annotated.

The local modelling module 46 generates a local 3D model "LM" of the environment in the memory 5, using the AR device's own sensor(s) e.g. camera(s) 18 and/or any dedicated depth sensors etc. The local modelling module 46 and sensor(s) constitute sensing apparatus of the AR device 2.

For reasons explained in detail below, an externally-generated 3D model "GM" ("global mesh") of the same environment is received from the network 26.

The model aggregation module selectively uses data of the local model LM and data of the externally-generated model GM to generate an aggregate 3D model "AM" for use by the rendering component 42 in rendering augmentations. That is augmentations are rendered based on at least one of local mesh data LM and global mesh data GM.

The device tracking module 50 tracks the location and orientation of the AR device 2, using local sensor data captured at the AR device 2. The sensor data can be captured in a number of ways, for example using the cameras 18 and/or other sensor(s) of the AR device 2. The tracking module indicated the current location and orientation of the AR device 2 to the rendering module 42, for example by outputting a current "pose vector" of the AR device. The pose vector is a six dimensional vector, for example (x, y, z, P, R, Y) where (x,y,z) are the device's Cartesian coordinates with respect to a suitable origin, and (P, R, Y) are the device's pitch, roll and yaw with respect to suitable reference axes.

The rendering module 42 adapts the augmentations based on the tracking, to account for the movement of the device i.e. to maintain the perception of the as 3D elements occupying the real-world, for example to ensure that static augmentations appear to remain static (which will in fact be achieved by scaling or rotating them as, from the AR user's perspective, the environment is moving relative to them).

Figure 3:
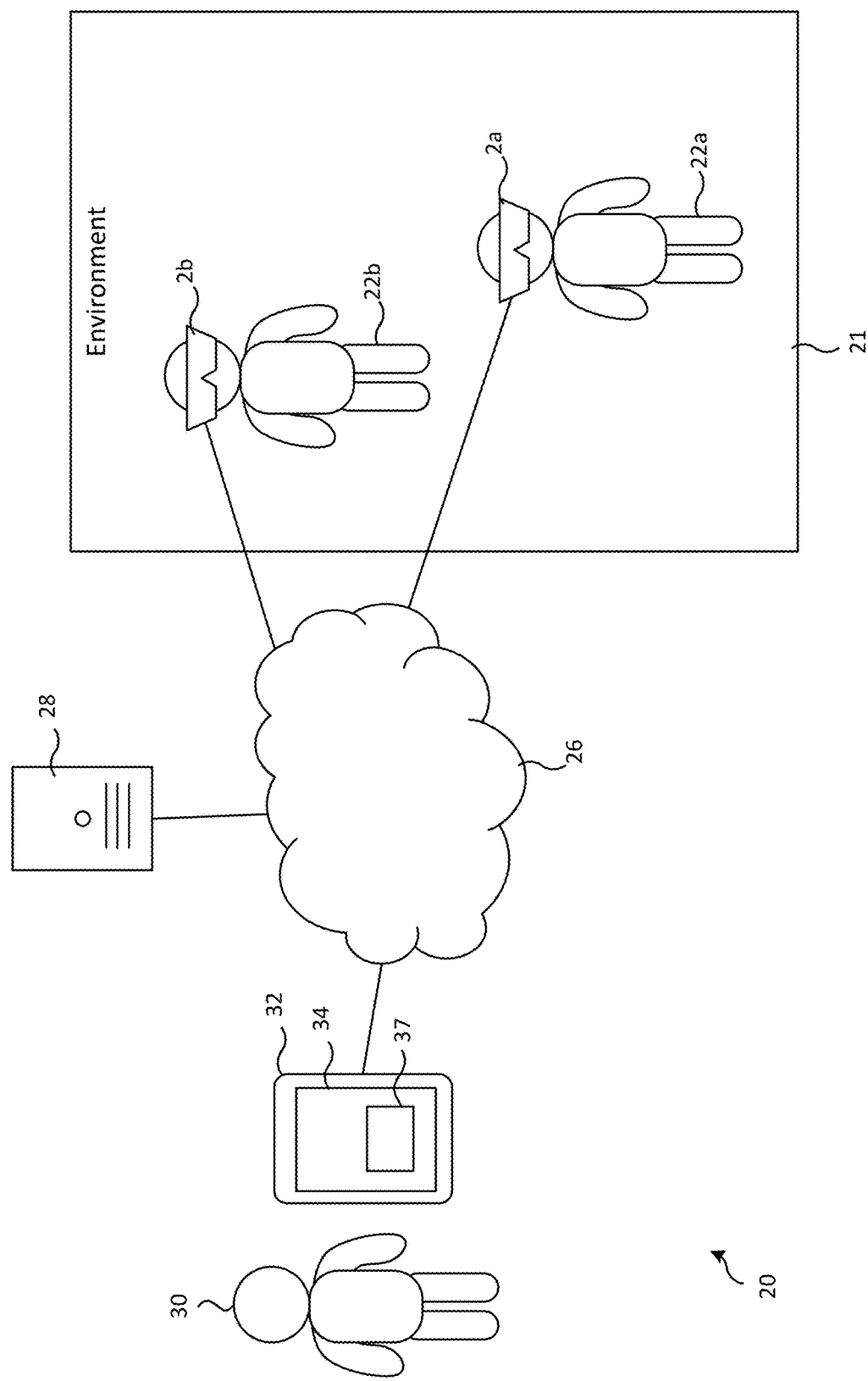
FIG. 3 shows a communication system.

Returning briefly to FIG. 1, the code 9 includes a communication client 36 ("AR client") for effecting communication events via a communications network 26 in a communication system 20 (see FIG. 3). The communication client 36, when executed on the AR device 2, enables the AR device 2 to establish real-time video communication events such as real-time video calls, instant messaging sessions, screen sharing or whiteboard sessions, etc., via the network 26, with another user(s) of the communication system 20 operating their own devices running their own version of the communication client software.

FIG. 3 shows another user 30, who is a far-end user from the perspective of the AR user 22. The far-end user 30 is operating a user device ("companion device") 32, which is shown to be connected to the network 26 and to be executing its own version of the client software 37 ("companion client"). The companion device 32 may, for example, be a smartphone, tablet, laptop or desktop computer device, smart TV or set-top box, games console etc.

Call audio and video data is transmitted and received over the network 26 during an established communication event. The communication is "real-time" in the sense in that there is only a short delay, for instance about 2 second or less, between audio/video being captured at a near-end device and received and outputted by a far-end device. The client may for example be a stand-alone software application that is executed on a processor of the relevant device and runs on top of an operating system, or a plugin to another application executed on the processor such as a Web browser.

The communication system may be based on voice or video over internet protocols (VoIP) systems. These systems are beneficial to the user as they are often of significantly lower cost than conventional fixed line or mobile cellular networks, particularly for long-distance communication. The client software 36, 37 sets up the VoIP connections as well as providing other functions such as registration and user authentication based on, say, login credentials such as a username and associated password.

Returning to FIG. 2, the encoder and decoder modules 53, 54 of FIG. 3 represent functionality implemented by executing the AR client 36 on the processing apparatus 3. The encoder module 52 receives image data from the cameras 18, audio data from the microphones 13 and transmits those data to the far-end companion device 32 as an outgoing data 55 stream via the network 26. The decoder 54 receives an incoming data stream 53 from the far-end device 32, and extracts the far-end user's call audio and video data therefrom.

The AR client 36 and companion client 37 are able to incorporate AR elements into a real-time communication event.

In a video call or other video-based communication event, the AR client 36 displays the video elements of the communication event as 3D augmentations. For example, a 3D augmentation may be rendered visible to the AR user of the AR device 2, which incorporates the far-end user's call video, or an image of what is currently being displayed on shown on their screen or on a shared whiteboard. For example, this element could be rendered so that it is perceived as being projected on a real-world surface, such as a table or wall; or it could be rendered as an apparently free-standing element at a particular location that the AR user can walk towards, away from and around. The decoder 54 generates, from the video data extracted from the incoming data stream, one or more call augmentation data objects "CA", which it supplies to the rendering module 42. The 2D surface data of the call object CA include at least part of the video data, so that the video data is displayed as surface texture of the call object CD when rendered by the rendering module 42.

The far-end user can also add their own augmentations, such as annotations, via a user interface of the companion device 32 by creating a suitable augmentation data object "RA" at the companion device 32 via a user interface of the companion client 37. The data object RA is transmitted to the AR device 2 in the incoming video stream 53. The decoder 54 extracts the remotely generated augmentation data object RA, and supplies it to the rendering module 42 for rendering in the same manner.

To be able to add annotations in this manner, the companion device 32 also needs access to the surface structure of the part of the environment being annotated. The encoder 54 therefore includes a version of the local mesh LM in the outgoing stream 55.

The AR user can also create their own augmentations via a user interface of the AR device 2. The user interface of the AR device may for example comprise a "natural" user interface (NUI). An NUI enables the user to interact with a device in a natural manner, free from artificial constraints imposed by certain input devices such as mice, keyboards, remote controls, and the like. Examples of NUI methods include those utilizing, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking etc.

In response to the user inputs, the local augmentation module 44 creates a local augmentation data object "LA" according to the user inputs. This data object LA is supplied to the rendering module 42 for rendering in the same manner as the call and remote data objects CA, RA. The local augmentation object is also provided to the encoder 52, which includes it in the outgoing data stream.

In a conventional video call, each device would normally capture video of its respective user and transmit it to the other call participant(s). However, here, the AR client 36 captures a moving image of the real-world view currently visible to the AR user instead, as captured using the cameras 18L, 18R on the headband 3, and transmits the moving image to the companion device 32 via the network 26 as a video signal. The companion client 37 received the video signal and displays it on a display of the companion device 32. The companion client 37 also renders any augmentations created by the far-end user 30 that are currently being perceived by the AR user, in the manner that they are currently being perceived, and displays them on the display 34 overlaid on the real-world image so as to provide a full representation of the AR user's AR "world".

Local data objects AR transmitted to the companion device 32 in the outgoing data stream are rendered by the companion device, and overlaid on the real-world image on the display 34. The pose vector of the device as generated by the tracking module 50 is also communicated to the companion device 32 in the outgoing stream for use by the companion device in displaying the AR user's world.

As well as real-time communication event functionality, the clients 36, 37 also support asynchronous AR-based communication, in which the companion device user 30 can view a representation of the AR user's world "offline" i.e. when the AR user is not located in the environment, and use a 3D model of the environment to add annotations which become visible to the AR user via their headset 2 at a later time of their choosing. The far-end user's annotation data objects are uploaded to a back-end computer system 28, and can be downloaded by the AR device 2 when the AR device is later activated in the environment.

Returning to FIG. 3, the back-end computer system ("augmented reality system") 28 is shown connected to the network 26, and is formed of one or more servers. The back-end computer system 28 is a cloud system in this example, i.e. implemented on a cloud computing platform based on hardware virtualization.

Also connected to the network 26 are multiple AR devices 2a, 2b of the kind described above. Each is worn by a respective AR user 22a, 22b, located in the same real-world environment 21 as one another. The present subject matter is particularly, though not exclusively, useful in the context of a large environment 21 occupied by a relatively large number of users 22a, 22b over time (at the same time or at different times) such a football stadium (and the users 22a, 22b may be watching a at a football match), museum, gallery etc.

Through the 3D data collection of multiple AR devices 2, the system can achieve a full immersive scaled up 3D view of the environment 21 with 3D annotation and augmented reality contents. Another application of device awareness is real-time share and edit of 3D CGI in the movie industry.

Figure 6:
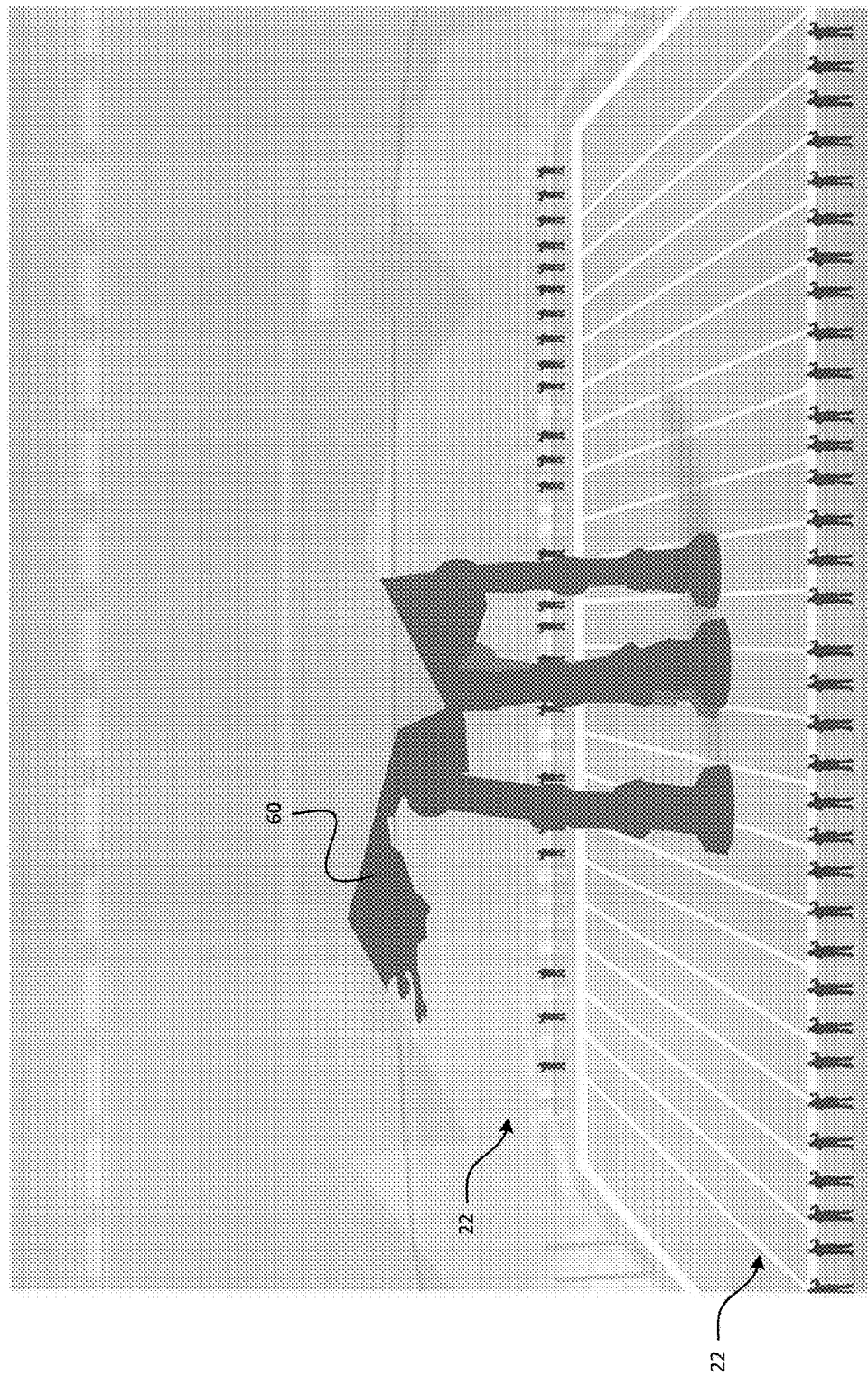
FIG. 6 shows an exemplary environment in which the subject matter can be applied.

FIG. 6 shows an exemplary environment 21, in which a large number of AR users 22 are congregated about a large real-world structure 60, having a complex surface geometry. By combining local mesh data LM form all of the users' AR devices, a comprehensive 3D model of the structure 60 can be generated.

This disclosure addresses the issue of having incomplete 3D mesh data of a space 21. A single AR device 2 device can only capture a limited amount of 3D data.

By using local meshes LM collected from a set of AR devices 2a, 2b, . . . of a common space 21, the mixed reality space can be extended with this data. This allows users to extend 3D interactions across a larger space beyond current capabilities.

This allows also an AR device user 22 with access to cloud data to be able to interact with a massively large augmented reality space.

This data can be collected by multiple users 22 collectively but asynchronously i.e. at different times (e.g. different hours, days, weeks, months etc.).

With data in the cloud gathered, the companion device 32 can also access and explore this shared space.

Multiple AR devices 2a, 2b collect the 3D volumetric data (in the form of their local meshes LM) of the space 21 at a time to upload to the cloud system 28. By collecting the data from multiple AR users 22a, 22b of the same space 21, it is possible to stitch together that data based on common reference points at the cloud system 28. When an AR user 22 accesses the data of the space from the cloud system 28, it is possible to identify that related data and allow the user 22 to explore the massively large space as needed. The depth perception of the AR device 22 will be limited in practice, but more details of the space 21 can be rendered in more detail as the user moves through the space 21 (see below).

This is achieved by the following mechanisms, implemented at the cloud system:

3D and real world scene capture of a space by multiple AR devices 22a, 22b;

Recognizing that sets of data (i.e. different local meshes LM) are related by common points of reference such as location (e.g. latitude and longitude data), time, date, etc.;

Stitching the data sets (i.e. the local meshes LM) together and overlapping common points. That is combining the multiple local models LM to form the global model GM based on the location data, time data, and detected common structure.

The local model LM, generated locally at the AR device 2, will in some scenarios provided only limited structural information about the environment. Whatever sensing apparatus is used to generate the local mesh LM, it will in practice have a limited sensor range. For example, the sensors will only be able to sense surfaces that are visible to the user i.e. the sensors cannot "see" behind an object. Moreover, the sensing apparatus will have a limited field of view and limited depth perception—limited physical limitations of the sensing apparatus, such as the optics of the sensor hardware and the processing capabilities of the device, and/or environmental factors such as ambient light levels or disruptive illumination. In practice, this means that, when the user 22 is standing in a particular location and looking in a particular direction, the only surface structure that can be detected will be that visible to the user 22 and in a limited volume of space in the vicinity of the sensing apparatus (outside of which the sensing apparatus is unable detect surfaces)—more limited than the user's visual range in most cases.

Should the AR user 22 move or turn their head, new surface structure becomes detectable. The local modelling module 46 updates the local model LM to add the newly detected surface structure. Thus as the user moves or looks around the environment, a more complete local model LM is built up over time.

Nevertheless, the issue of incomplete local data remains, and this is particular acute when the AR user first encounters a previously unknown environment.

As indicated above, this issue is addressed through the use of the externally-generated global mesh GM of the same environment 21. The model aggregation module selectively uses data of the local model LM and data of the externally-generated model GM to generate the aggregate 3D model AM, which has a greater structural information content than the local model LM, for use by the rendering component 42 in rendering augmentations.

This allows the depth perception and field of view of the sensor apparatus of the AR device 2 to be effectively extended, using mesh data previously collected by other AR devices that are or were in the same environment 21. This, in turn, allows a permits a greater range of AR functionality that is not restricted by the physical limitations of the sensing apparatus of the AR device 2 or conditions of the environment 21.

To illustrate this, two scenarios will now be considered, in which the AR functionality of an AR device 2 is exploited to allow the companion device user 30 to annotate the AR user's perceived environment with virtual augmentations.

In the first scenario, the AR functionality of the AR device 2 is based on the local mesh LM alone, and which does not make use of the global mesh of the present disclosure. A method of effecting an AR-based communication in this scenario will now be described with reference to FIG. 4.

Figure 4:
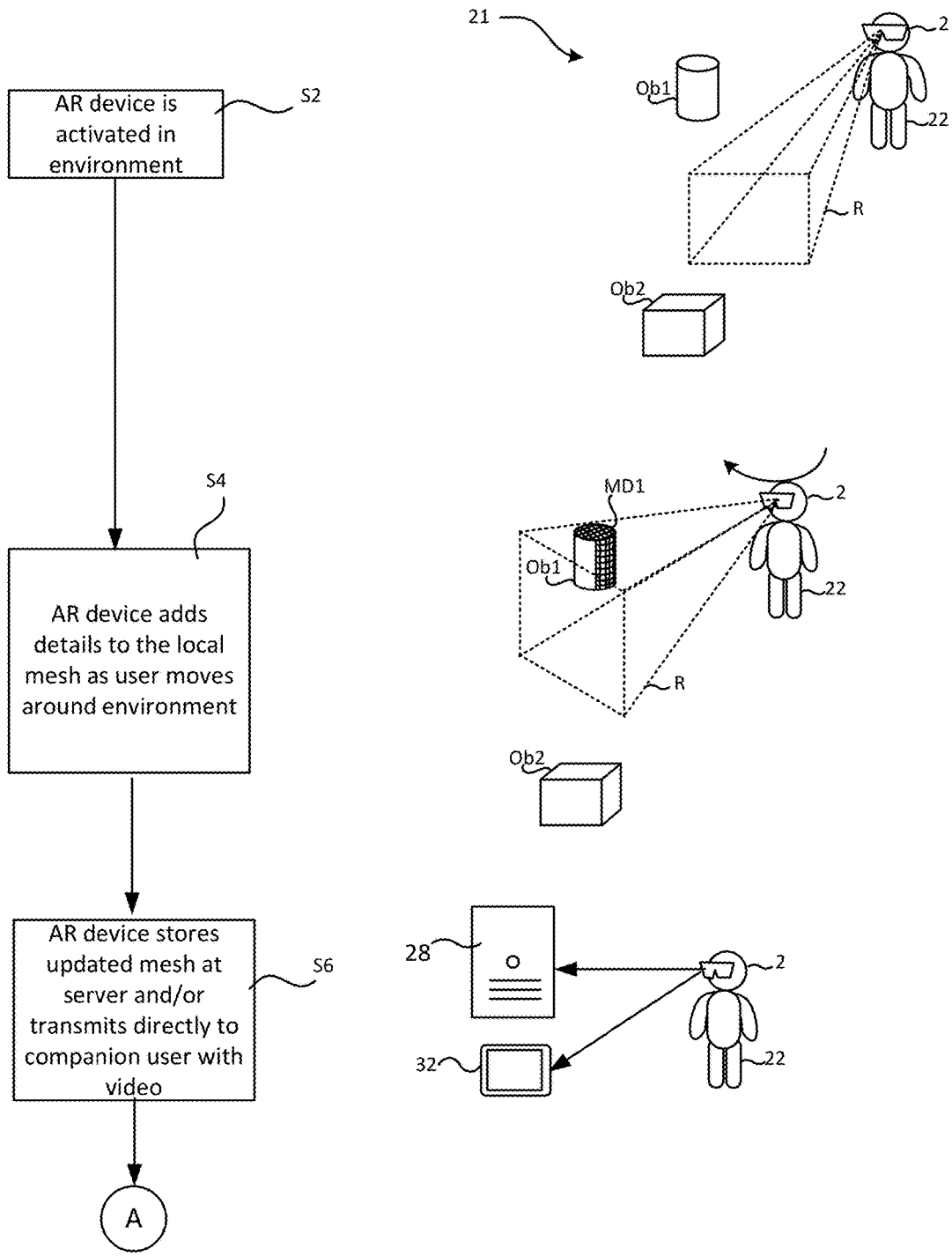
FIG. 4 shows a method of effecting AR-based communication between a user an another user.
Figure 4:
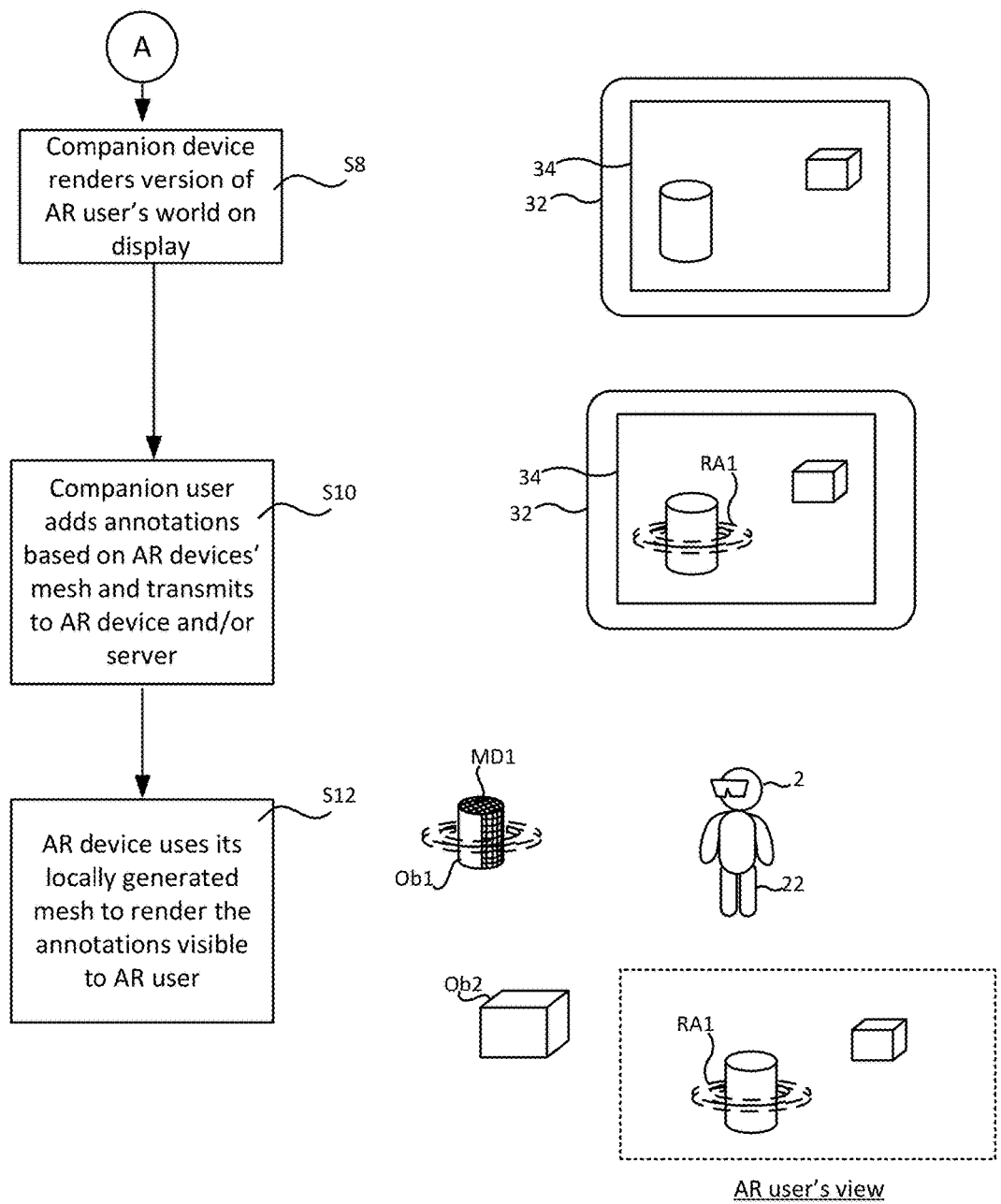

FIG. 4 shows a flowchart for the method on the left-hand side, with a pictorial representation of the method steps on the right.

At step S2, the AR device 2 is activated. A volume of space R is shown, forward of the AR device's sensor apparatus. Due to the limitations of the device and/or environmental factors, the AR device 2 cannot detect surface structure outside of this volume R, and thus cannot detect the surface structure of two (physical) objects Ob1, Ob2 due to the location of the AR user 22 and the direction in which they are facing—even though they are visible to the user 22. Thus, at this point in time, it is not possible to annotate either of the visible objects Ob1, Ob2, as none of their surface structure has been captured as mesh data of the local mesh LM.

It is only as the user moves within the environment (S4), for example by turning their head to face the first object Ob1, that mesh data MD1 representing some of its surface structure can be captured and added to the local model LM. Moreover, if the AR user 22 does not move closer to the more distant second object Ob2 so that it comes into range of the sensing apparatus, it will not be possible to detect its surface structure and therefore not possible to annotate it.

So that the companion device user 30 can add their own annotations to the AR user's previewed world, at step S6, the AR device 2 transmits the updated local mesh LM via the network 26 to the companion device 32, e.g. in a real-time AR communication event so that the companion user 30 can make annotations to the AR user's world in real-time, and/or to the cloud system 28 for storage thereat, so that the companion device 32 can retrieve it and make such annotations offline at a time of their choosing. A moving image of the environment 21 as captured with at least one of the camera's 18L, 18R is transmitted in association with the model, so that the companion device user 30 can also see the 2D texture of the environment as well as its 3D structure.

At step S8, either in real-time or offline, the companion device displays the moving image on its display 32. The companion user can 30 can pause or rewind the image with suitable user inputs at the companion device 34.

At step S10, the companion user 30 adds their own annotation RA1 to the moving image, which in this example is a three dimensional ring surrounding the first object Ob1. Because the AR user has not moved close enough to the second object Ob2, its surface structure is not encapsulated in the local mesh LM so the companion user 30 cannot annotate it.

The companion device 34 transmits the annotation as an annotation data object via the network 26:
  back to the AR device 2 e.g. in real-time via the network, and/or
  to the cloud system 28 for storage thereat so that:
a. it can be retrieved by the AR user 22 at a time of their choosing (i.e. offline,) and/or
b. so that a media relay server of the system 28 can relay the data object to the AR device 2 in real-time i.e. the media relay server receives the data object and transmits it to the AR device 2 straightaway.

At step S10, uses the received or retrieved data object to render the companion user's annotation visible to the AR user 22.

As above, real-time in this context means that there is only a short delay (e.g. about two seconds or less) between the rendering data being transmitted by the companion device 32 and received by the AR device 2, including when it is related via the media relay of the cloud system 28.

Note that steps S10-S12 are only possible after the user 22 has spent some time navigating the environment, building up the required level of detail in the local mesh LM.

Now consider a scenario in which a global mesh, generated by stitching together multiple meshes from numerous Hololens users, is used instead.

Figure 5:
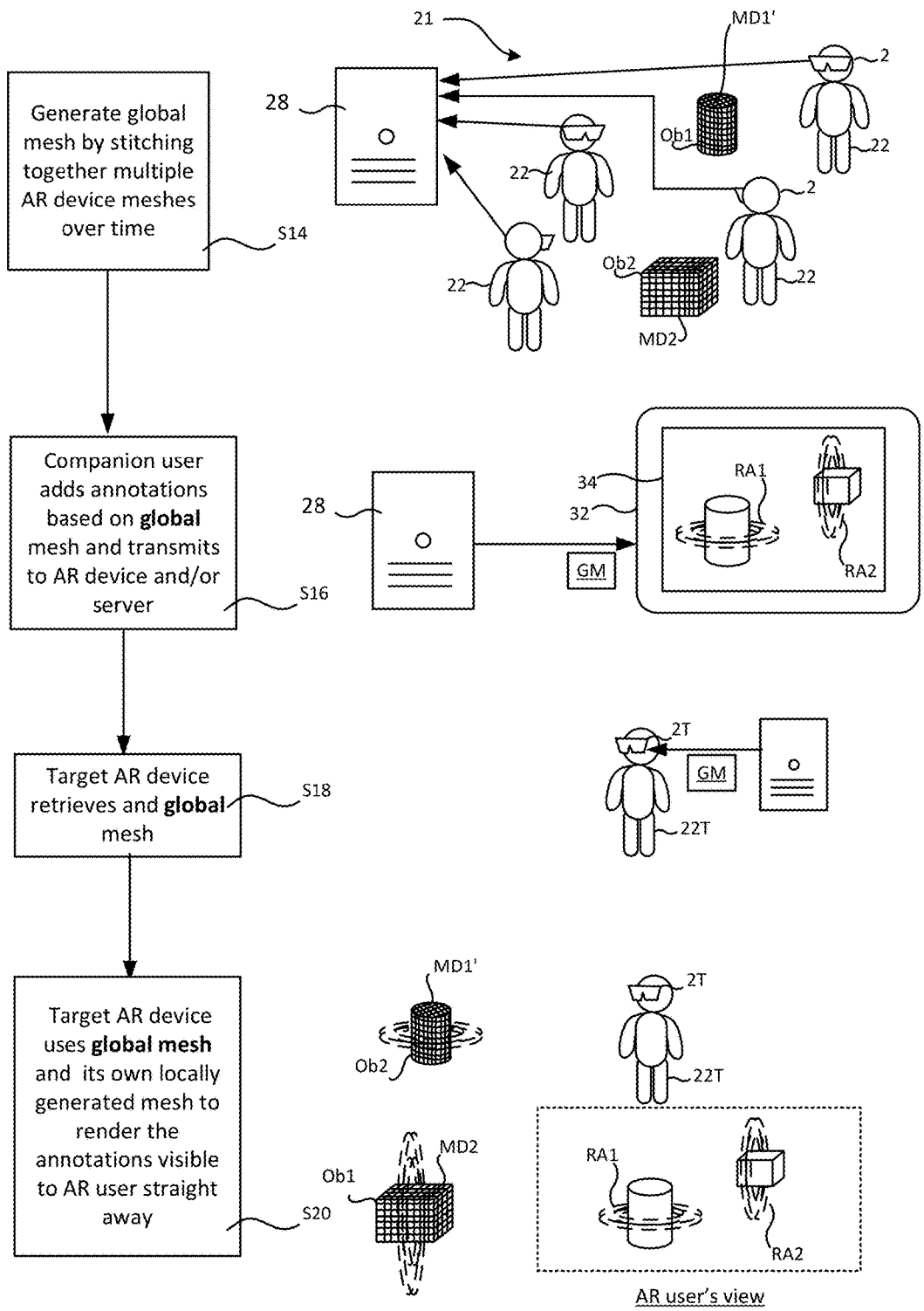
FIG. 5 shows an improved method of effecting AR-based communication between a user an another user, in accordance with the present subject matter.

FIG. 5 shows a flow chart of a method for effecting AR-based communication within the communication system 20, in accordance the present subject matter. Over time, local meshes are transmitted to the cloud system 28 from multiple AR devices 2. Each local mesh Lm is transmitted associated with location and timing information indicating where and when that local mesh Lm was captured. The cloud system 28 identifies when multiple local meshes pertain to similar locations, for example based on a location filtering criteria. It them detects common structures in the meshes, and based on these combines the local meshes LM to generate the global mesh GM of the environment 21. As new local meshes LM are received, the global mesh is updated accordingly. The global mesh may be implemented between communication events (e.g. calls) i.e. a communication even between users may use an earlier version of the global mesh GM for annotations, after that communication event has terminated the global mesh is updated, and the updated version used for annotations in a later communication event between the users or between different users. Timing constraints may also be imposed, so that local mesh data incorporated in the global mesh is removed a predetermined amount of time after it was captured. In this manner, it is possible to build up a comprehensive global model GM of the environment 21 that is would be arduous to generate with only a single AR device. This includes full mesh data representations MD1', MD2 of the surface structure of the first and second objects Ob1, Ob2. The global mesh GM is stored at the cloud system 28 in association with location metadata identifying a location of the environment 21.

At step S16, the companion device user 30 uses their device 32 to retrieve the global mesh from the cloud system 28 by downloading it through a suitable request to the cloud system 21, and make annotations in the same was as described above, but based on the downloaded global mesh Gm rather than a single local mesh LM. This can be offline, or during a real-time communication event (e.g. the global mesh Gm can be downloaded by the companion device 32 at the start of the real-time communication event, for use therein). The companion device then transmits their annotations as data objects to a target AR user 22T using a target AR device 2T, or to the cloud system 28 for storing thereat so that the target device 22T can retrieve it later.

At step S18, the target user retrieves the global mesh GM from the cloud system 28. This step could for example be performed when the target user device 2T is first activated in the environment, or at the start of a real-time communication event. The target user device transmits an indication of its current location to the cloud system 22, which is matched to the location metadata associated with the global mesh GM at the cloud system 28, enabling the global mesh GM for that environment 21 to be retrieved.

At step S20 the target AR device 2T uses the global mesh GM to render the annotations received from the companion device 32. These may have been received directly from the companion device 32 during a real-time communication event, or downloaded from the cloud system 28 in an offline annotation scenario.

Note that the annotations can be rendered as soon as the annotations have been received, before the target user 22T has walked through the environment (as the annotation capabilities are no longer limited by the target device's own local mesh data). Thus, for example, when an AR user first walks into a previously unknown AR environment, the can immediately be presented with virtual elements extending over a wide area of the environment—for example annotations of distant objects, or more generally augmentations perceived to be far away and still interact with the real-world environment 21—in a way that would not be possible using only local meshes.

As mentioned above, the model aggregation module 44 of the target device 2T combines the target devices own local mesh LM with the global mesh GM (see FIG. 2), to generate an aggregate mesh AM which can incorporate mesh data from both. For example, in the event of a mismatch between some of the surface structure in the local mesh LM and corresponding surface structure in the global mesh GB, the surface structure in the local mesh LM may override the global mesh GM as it is more likely to be up-to-date. The local mesh LM may still be transmitted to the companion device 32, so that it can create its own aggregate mesh to provide more accurate annotation functionality; or the aggregate mesh AM may be transmitted to the companion device 32 for the same purpose.

The target companion device also transmits its own local mesh Lm to the cloud system 28 in association with timing and location information, for use in updating the version of the global mesh GM stored thereat.

Whilst in the above, a global mesh GM is received from a server via the Internet 26, alternatively local mesh data could be exchanged between AR devices in the environment in a decentralized fashion, for example by establishing an ad-hoc mesh network (e.g. using Bluetooth or other wireless NFC technology) between AR devices in the environment so that they can exchange their local meshes via the ad-hoc network.

In a first aspect, augmented reality apparatus comprises: stereoscopic display apparatus arranged to provide to a user of the augmented reality apparatus a view of a real-world environment in which the user is located, wherein the display apparatus is configured to generate a stereoscopic image that is visible to the user simultaneously with the real-world view; a computer interface configured to receive from a network externally generated 3D model data of the real-world environment in which the user is located; and a rendering module configured to use the externally generated 3D model data to control the display apparatus to render a virtual element in a manner such that it is perceived by the user as a 3D element located at a desired location in the real-world environment.

In embodiments, the augmented reality apparatus may further comprise: memory; and sensor apparatus for detecting surface structure in the real-world environment, wherein the sensor apparatus is configured to generate in the memory local 3D model data of the real-world environment that embodies surface structure of the real-world environment, and to update the local 3D model data to embody new surface structure as it become detectable due to movement of the sensor apparatus within the environment; wherein the externally-generated 3D model data received from the network is used to render the virtual element in said manner at least when the surface structure embodied in the local 3D model data is insufficient for the local 3D model data to be used thus.

The computer interface may be configured to retrieve via the network the externally generated 3D model data from a server.

For example, the externally generated 3D model may be retrieved from the server by transmitting a location of the real-world environment from the augmented reality apparatus to the server for comparison thereat with location data associated with the externally generated 3D model data.

Alternatively or in addition, the computer interface may be configured to transmit via the network the local 3D model data to the server for use by the server in generating an updated version of the externally generated 3D model data. For example, the local 3D model data may be transmitted in association with location information and/or timing information pertaining to the local 3D model data.

The rendering module may be configured to receive element location data defining the desired location from the network or another network.

For example, the element location data may be received via the network or the other network from another user in a real-time communication event between the user and the other user, or retrieved by the augmented reality apparatus from a server.

For example, the element location data may be received in a virtual element data object that defines the virtual element, the data object also comprising: structural data defining 3D surface structure of the virtual element, and/or image data defining 2D surface texture of the virtual element.

The augmented reality apparatus may be configured to determine the desired location based on user inputs received from the user of the augmented reality apparatus.

The rendering module may be configured to apply at least one rendering criteria to the externally generated 3D model to detect surface structure in the real world environment that the user would expect to exert an influence on the virtual element, wherein the rendering of the virtual element is based on said detection.

For example, the at least one influence criteria may be based on a location and/or an orientation of the detected surface structure as indicated by the externally generated 3D model data; and/or a location and/or an orientation of the display apparatus.

For example, the rendering of the virtual element based on said detection may comprise at least one of:

suppressing part of the virtual element so that surface structure detected at a location between the virtual element and the user is perceived as partially obscuring the virtual element;

applying an animation effect to the virtual element so that it is perceived as interacting dynamically with detected surface structure; and modifying the desired location at which the virtual element is perceived to be located to account for detected surface structure.

The element location data may define the desired location relative to a known piece of surface structure embodied by the externally generated 3D model data.

At least the display apparatus may be embodied in a wearable headset. For example, the augmented reality apparatus may be embodied in a wearable headset (i.e. the whole apparatus), or the other functionality may be embodied in a component separate from the headset such as a smartphone.

The display apparatus may comprise two substantially transparent viewing portions through which the real-world is visible and thereby provide the real-world view, and each substantially transparent viewing portion may be arranged to project a respective image component of the stereoscopic image onto a respective eye of the user.

For example, the display apparatus may comprise light engine apparatus controllable by the rendering module to emit image light, and two optical components mounted on the headset, each located to project a different portion of the image light onto a respective eye of the user thereby generating the stereoscopic image; the optical components may be substantially transparent and thereby provide the real-world view.

In a second aspect, there is provided a method of controlling an augmented reality apparatus that comprises display apparatus configured to provide a view of a real-world environment in which a user of the augmenter reality apparatus is located, the code method comprising: controlling the stereoscopic display apparatus of the augmented reality apparatus to generate a stereoscopic image that is visible to the user simultaneously with the real-world view; receiving from a network externally generated 3D model data of the real-world environment in which the user is located; and using the externally generated 3D model data to control the display apparatus to render a virtual element in a manner such that it is perceived by the user as a 3D element located at a desired location in the real-world environment.

According to a third aspect, an augmented reality system comprises: a computer interface configured to receive a plurality of local 3D models of a part of a real-world environment, each having been generated by a different augmented reality device when located in the real-world environment; and a global modelling module configured to combine the local 3D models to generate a global 3D model representing a greater portion of the real-environment than any of the local 3D models individually, and to transmit at least part of the global 3D model to a target augmented reality device currently located in the real-world environment for use in rendering a virtual element thereat.

In embodiments, the global modelling module may be configured to transmit at least part of the global 3D model to a device remote from the real-world environment, thereby allowing the remote device to explore and augment a virtual version of the real-world environment remotely.

For example, the augmented reality system may also comprise an augmentation sharing module configured to: receive rendering data from the remote device, the rendering data for rendering a virtual object at the target augmented reality device, and transmit the rendering data to the target augmented reality device.

In some cases, the global 3D model may be transmitted to the remote device in response to a download request from the remote device, and/or the rendering data may be transmitted to the target augmented reality device on response to a download request from the augmented reality device.

The remote device may for example be a smartphone or tablet.

In a third aspect, an augmented reality system comprises: a computer interface configured to receive a plurality of local 3D models of a part of a real-world environment, each having been generated by a different augmented reality device when located in the real-world environment; a global model generation module configured to combine the local 3D models to generate a global 3D model representing a greater portion of the real-environment than any of the local 3D models individually, and to transmit at least part of the global 3D model to a device remote from the real-world environment, thereby allowing the remote device to explore and augment a virtual version of the real-world environment remotely; and an augmentation sharing module configured to: receive rendering data from the remote device, the rendering data for use in rendering a virtual object at an augmented reality device in the real-world environment, and to transmit the rendering data to the augmented reality device when the augmented reality device is located in the real-world environment.

In embodiments, the rendering data is received from the remote device and transmitted to the augmented reality device in real-time.

The rendering data may be received from the remote device and transmitted to the augmented reality device during a communication event between a user of the remote device and a user of the augmented reality device.

For example, the computer interface may be configured to receive at least one additional local 3D model from at least one additional augmented reality device when located in the real-world environment; the augmentation sharing module may be configured to update the global 3D model, at a time after the communication event has terminated, based on the at least one additional local 3D model, the updated global 3D model for use in a future communication event between users.

The augmentation sharing module may be configured to receive additional rendering data from the augmented reality device and transmit it to the remote device, the additional rendering data for use in rendering another virtual object at the remote device using the global 3D model.

For example, the additional rendering data may be received from the augmented reality device and transmitted to the remote device in real-time.

Alternatively, the augmentation sharing module may be configured to store the rendering data in computer storage of the augmented reality system, and to transmit it to the augmented reality device in response to a download request from the augmented reality device.

The computer interface may be configured to receive at least one additional local 3D model from at least one additional augmented reality device when located in the real-world environment, and the augmentation sharing module may be configured to update the global 3D model, at a time after the global 3D model has been generated, based on the at least one additional local 3D model.

Each local 3D model may be received in association with location information pertaining to that local 3D model, and the global model generation module may be configured to identify the plurality of local 3D models as pertaining to the (same) real-world environment based on their associated location information, and select them for use in generating the global 3D model based on said identification.

Alternatively or in addition, each local 3D model may be received in association with timing information pertaining to that local 3D model data, wherein the global model generation module is configured to identify the plurality of local 3D models as pertaining to a pre-determined interval of time and select them for use in generating the global 3D model based on said identification.

For example, the global model generation module may be configured to determine an age of at least one of the local 3D models based on its associated timing information and, in response to the age reaching an age threshold, update the global 3D model in order to remove data from the global 3D model that was derived from the at least one local 3D model e.g. after a communication event has terminated, for use in a future communication event.

The global 3D model may also be transmitted to the augmented reality device for use in rendering the virtual element thereat.

A fourth aspect is directed to a method of effecting communication via a network between an augmented reality device in a real-world environment and another device remote from the real-world environment, the method comprising implementing at the other device the following steps: receiving a global 3D model, the global 3D model having been generated by combining a plurality of local 3D models of a part of the real-world environment, each local 3D model having been generated by a different augmented reality device when located in the real-world environment, wherein the global 3D model represents a greater portion of the real-environment than any of the local 3D models individually; transmitting at least part of the global 3D model to the remote device, thereby allowing the remote device to explore and augment a virtual version of the real-world environment remotely; using the global 3D model to generate rendering data for use in rendering a virtual object at an augmented reality device in the real-world environment; and transmitting the rendering data to the augmented reality device via the network when the augmented reality device is located in the real-world environment and/or to an augmented reality system In embodiments, the communication may be a real-time communication event between a user of the augmented reality device and a user of the other device conducted via the network, the rendering data being transmitted from the other device to the augmented reality device in real-time.

For example, the rendering data may be transmitted to the augmented reality device from the other device via the augmented reality system, the rendering data being relayed between the devices by the augmented reality system in real-time.

The augmented reality data may be transmitted to the augmented reality system for storage thereat.

The method may comprise: receiving at the other device additional rendering data from the augmented reality device via the network; and using, by the other device, the additional rendering data to render an additional virtual element on a display of the other device.

The method may comprise:

a. receiving a video signal at the other device from the augmented reality device via the network; and b. displaying on the display, by the other device, a moving image derived from the video signal, wherein the additional virtual element is overlaid on the moving image on the display.

In some cases, the global 3D model may be used by the other device to render the additional virtual element.

In a fifth aspect, a communication system comprises a device remote from a real-world environment; and an augmented reality system comprising: (i) a computer interface configured to receive a plurality of local 3D models of a part of the real-world environment, each having been generated by a different augmented reality device when located in the real-world environment, and (ii) a global model generation module configured to combine the local 3D models to generate a global 3D model representing a greater portion of the real-environment than any of the local 3D models individually, and transmit at least part of the global 3D model to the remote device, thereby allowing the remote device to explore and augment a virtual version of the real-world environment remotely; wherein the remote device is configured to use the global 3D model to generate rendering data for use in rendering a virtual object at an augmented reality device in the real-world environment, and to transmit the rendering data to the augmented reality device when the augmented reality device is located in the real-world environment and/or to the augmented reality system (e.g. for storage thereat and/or for relating to the augmented reality device).

Note any of the system functionality may be implemented in a corresponding method steps of a method of effecting shared-reality communications.

In a sixth aspect, a computer readable medium stores executable code, the code when executed on a computer system (e.g. embodied in a user device, or a distributed cloud system) to implement any of the system functionality or method steps disclosed herein.

Generally, any of the functions described herein can be implemented using software, firmware, hardware (e.g., fixed logic circuitry), or a combination of these implementations. The terms "module," "functionality," "component" and "logic" as used herein, such as the functional modules of FIG. 2, generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the AR or companion devices (user terminals) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An augmented reality system comprising:
a computer interface configured to receive a plurality of local 3D models of a part of a real-world environment;
a global model generation module configured to combine the local 3D models to generate a global 3D model representing a greater portion of the real-world environment than any of the local 3D models individually, and to-transmit at least part of the global 3D model to a device remote from the real-world environment, thereby allowing the remote device to explore and augment a virtual version of the real-world environment remotely; and
an augmentation sharing module configured to:
receive an augmentation separate from the global 3D model from the remote device, the augmentation including rendering data for use in rendering a 3D virtual object at an augmented reality device in the real-world environment corresponding to a particular location associated with the global 3D model;
transmit at least a portion of the global 3D model to the augmented reality device; and
transmit the augmentation to the augmented reality device when the augmented reality device is located in the real-world environment without modifying the global 3D model to include the augmentation, such that the augmented reality device can utilize the global 3D model to identify the particular location within the real-world environment and render the 3D virtual object at the particular location.

2. An augmented reality system according to claim 1, wherein the rendering data is received from the remote device and transmitted to the augmented reality device in real-time.

3. An augmented reality system according to claim 1, wherein the rendering data is received from the remote device and transmitted to the augmented reality device during a communication event between a user of the remote device and a user of the augmented reality device.

4. An augmented reality system according to claim 3, wherein the computer interface is configured to receive at least one additional local 3D model from at least one additional augmented reality device when located in the real-world environment;
wherein the augmentation sharing module is configured to update the global 3D model, at a time after the communication event has terminated, based on the at least one additional local 3D model, the updated global 3D model for use in a future communication event between users.

5. An augmented reality system according to claim 1, wherein the augmentation sharing module is configured to receive additional rendering data from the augmented reality device and transmit it to the remote device, the additional rendering data for use in rendering another virtual object at the remote device using the global 3D model.

6. An augmented reality system according to claim 5, wherein the additional rendering data is received from the augmented reality device and transmitted to the remote device in real-time.

7. An augmented reality system according to claim 1, wherein the augmentation sharing module is configured to store the rendering data in computer storage of the augmented reality system, and to transmit it to the augmented reality device in response to a download request from the augmented reality device.

8. An augmented reality system according to claim 1, wherein the computer interface is configured to receive at least one additional local 3D model from at least one additional augmented reality device when located in the real-world environment, wherein the augmentation sharing module is configured to update the global 3D model, at a time after the global 3D model has been generated, based on the at least one additional local 3D model.

9. An augmented reality system according to claim 1, wherein each local 3D model is received in association with location information pertaining to that local 3D model, wherein the global model generation module is configured to identify the plurality of local 3D models as pertaining to the same real-world environment based on their associated location information, and select them for use in generating the global 3D model based on said identification.

10. An augmented reality system according to claim 1, wherein each local 3D model is received in association with timing information pertaining to that local 3D model data, wherein the global model generation module is configured to identify the plurality of local 3D models as pertaining to a pre-determined interval of time and select them for use in generating the global 3D model based on said identification.

11. An augmented reality system according to claim 10, wherein the global model generation module is configured to determine an age of at least one of the local 3D models based on its associated timing information and, in response to the age reaching an age threshold, update the global 3D model in order to remove data from the global 3D model that was derived from the at least one local 3D model.

12. An augmented reality system according to claim 5, wherein the additional rendering data associated with the another virtual object is transmitted to the augmented reality device for use in rendering the another virtual object.

13. A method of effecting communication via a network between an augmented reality device in a real-world environment and another device remote from the real-world environment, the method comprising:
receiving a global 3D model, the global 3D model having been generated by combining a plurality of local 3D models of a part of the real-world environment, wherein the global 3D model represents a greater portion of the real-world environment than any of the local 3D models individually;
transmitting at least part of the global 3D model to the remote device, thereby allowing the remote device to explore and augment a virtual version of the real-world environment remotely;
receiving an augmentation separate from the global 3D model from the remote device;
using the global 3D model and the augmentation to generate rendering data for use in rendering a 3D virtual object corresponding to the augmentation at an augmented reality device in the real-world environment corresponding to a particular location associated with the global 3D model; and
transmitting the rendering data and at least a portion of the global 3D model to the augmented reality device via the network when the augmented reality device is located in the real-world environment without modifying the global 3D model to include the augmentation, such that the augmented reality device can utilize the global 3D model to identify the particular location within the real-world environment and render the 3D virtual object at the particular location.

14. A method according to claim 13, wherein the communication is a real-time communication event between a user of the augmented reality device and a user of the remote device conducted via the network, the rendering data being transmitted from the remote device to the augmented reality device in real-time.

15. A method according to claim 14 wherein the rendering data is transmitted to the augmented reality device from the remote device via an augmented reality system, the rendering data being relayed between the devices by the augmented reality system in real-time.

16. A method according to claim 13, wherein the rendering data is transmitted to an augmented reality system for storage thereat.

17. A method according to claim 13, comprising:
receiving at the remote device additional rendering data from the augmented reality device via the network; and
using, by the remote device, the additional rendering data to render an additional virtual element on a display of the remote device.

18. A method according to claim 17, comprising:
receiving a video signal at the remote device from the augmented reality device via the network; and
displaying on the display, by the remote device, a moving image derived from the video signal, wherein the additional virtual element is overlaid on the moving image on the display.

19. A method according to claim 17, wherein the global 3D model is used by the remote device to render the additional virtual element.

20. A communication system comprising:
a device remote from a real-world environment; and
an augmented reality system comprising: a computer interface configured to receive a plurality of local 3D models of a part of the real-world environment, and a global model generation module configured to combine the local 3D models to generate a global 3D model representing a greater portion of the real-environment than any of the local 3D models individually, and transmit at least part of the global 3D model to the remote device, thereby allowing the remote device to explore and augment a virtual version of the real-world environment remotely;
wherein the remote device is configured to create an augmentation separate from the global 3D model and use the global 3D model to generate rendering data for use in rendering a virtual object corresponding to the augmentation at an augmented reality device in the real-world environment corresponding to a particular location associated with the global 3D model, and to transmit the rendering data and at least a portion of the global 3D model to the augmented reality device when the augmented reality device is located in the real-world environment and/or to the augmented reality system without modifying the global 3D model to include the augmentation, such that the augmented reality device can utilize the global 3D model to identify the particular location within the real-world environment and render the 3D virtual object at the particular location.

* * * * *